United States Patent [19]
Sebo et al.

[11] 3,953,079
[45] Apr. 27, 1976

[54] FLUID PRESSURE BRAKING SYSTEM INCLUDING A PRESSURE DIFFERENTIAL RESPONSIVE VALVE DEVICE

[75] Inventors: Milan J. Sebo; Roy E. Bartholomew, both of Elyria, Ohio

[73] Assignee: The Bendix Corporation, South Bend, Ind.

[22] Filed: Mar. 6, 1975

[21] Appl. No.: 556,042

[52] U.S. Cl. .................................. 303/7; 188/3 R; 303/68
[51] Int. Cl.² ........................................ B60T 13/00
[58] Field of Search .............. 303/7, 6 R, 9, 13, 68, 303/69, 71, 28, 32, 40, 29, 87; 188/3; 137/87, 119, 98

[56] References Cited
UNITED STATES PATENTS

| | | | |
|---|---|---|---|
| 3,003,822 | 10/1961 | McCarthy | 303/9 |
| 3,228,730 | 1/1966 | Schubert | 303/13 X |
| 3,241,888 | 3/1966 | Ternent | 303/9 X |
| 3,272,567 | 9/1966 | Vielmo | 303/9 X |
| 3,294,455 | 12/1966 | Valentine | 303/13 X |
| 3,504,946 | 4/1970 | Valentine et al. | 303/9 |
| R25,969 | 3/1966 | Valentine | 303/29 |

FOREIGN PATENTS OR APPLICATIONS

| | | | |
|---|---|---|---|
| 1,387,540 | 12/1964 | France | 303/9 |

*Primary Examiner*—Trygve M. Blix
*Assistant Examiner*—Douglas C. Butler
*Attorney, Agent, or Firm*—Ken C. Decker; William N. Antonis

[57] ABSTRACT

The service and emergency braking system for use on articulated vehicles having service brakes actuated by air pressure and having emergency brakes held in a released condition by air pressure. The system includes valving which is responsive to a pressure differential between the fluid pressure level in the service line connecting the portions of the articulated vehicle and a reference pressure, so that the emergency brake control is vented during a service brake actuation to permit the emergency brakes to effect a brake application when the pressure of the service line drops below the reference pressure by a predetermined amount, thereby providing braking on all portions of the vehicle in an emergency braking situation when the service brake line interconnecting the portions of the vehicle has been broken or has been left disconnected. The reference pressure is generally at the outlet of a regulating valve having an inlet connected to the outlet of the conventional operator-actuated service brake control valve. The regulating valve is provided with valve members between the inlet and outlet thereof which delays fluid communication until the pressure at the inlet attains a predetermined level whereupon the valve opens to permit communication between the inlet and outlet through a flow restricting orifice. Upon release of the brakes, the regulating valve opens to permit substantially uninhibited fluid communication between the inlet and the outlet.

5 Claims, 1 Drawing Figure

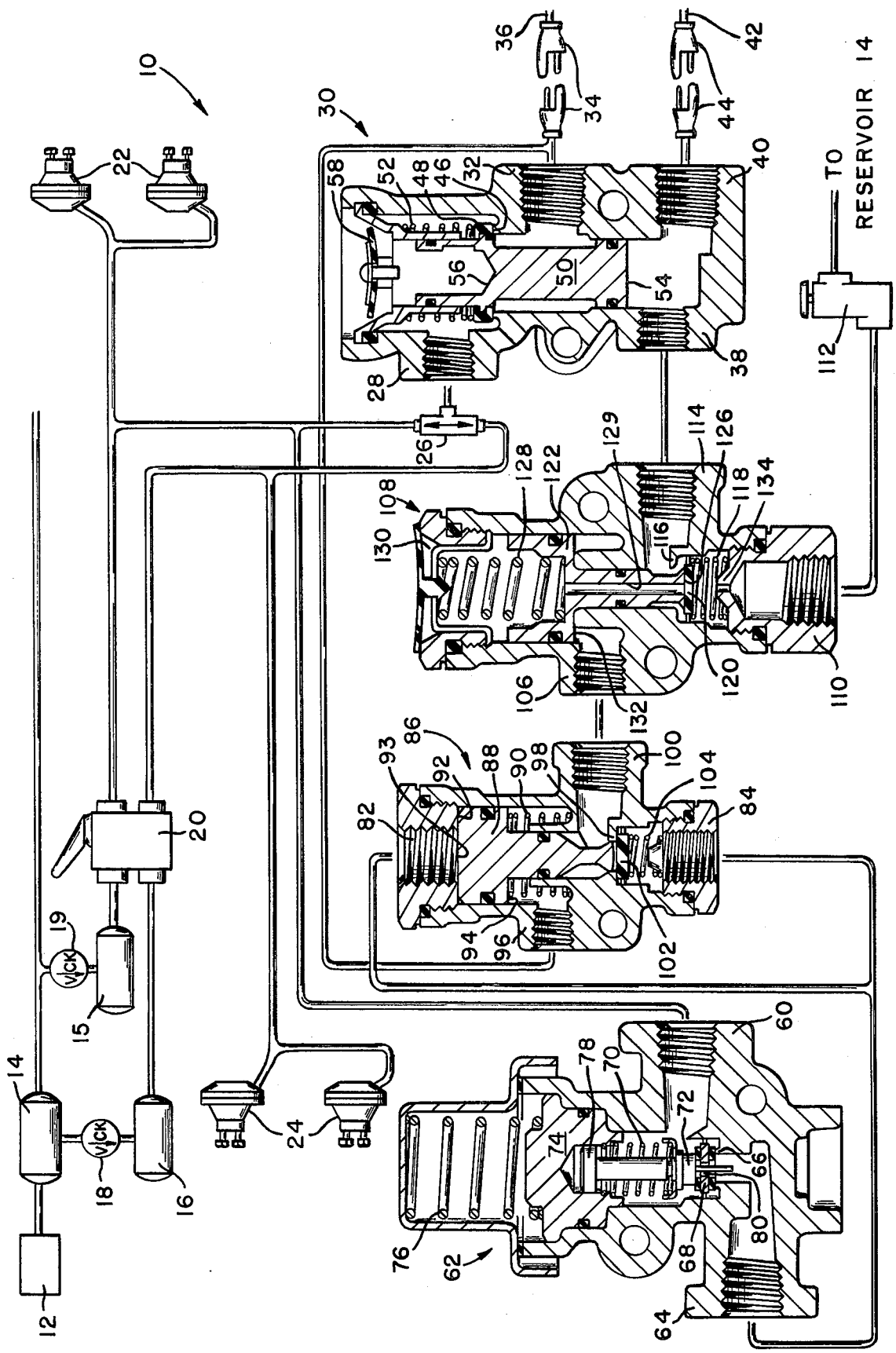

FLUID PRESSURE BRAKING SYSTEM INCLUDING A PRESSURE DIFFERENTIAL RESPONSIVE VALVE DEVICE

BACKGROUND OF THE INVENTION

This invention relates to a service and emergency braking system for an articulated vehicle having service brakes actuated by air pressure and also having emergency brakes which are held in their released condition by air pressure.

Articulated vehicles of the type which have air actuated brakes are normally provided with a trailer control line interconnecting the two portions of the vehicle for communicating service brake control pressure from the tractor to the trailer brakes and are also provided with a trailer supply line to provide actuation pressure for the trailer service brakes and pressure for operation and control of the trailer emergency and/or parking brakes. Prior art braking systems for these vehicles have provided a tractor protection system which does apply the trailer emergency brakes and also shuts off communication through the lines interconnecting the tractor and trailer portion of the vehicle, when the fluid pressure level in the tractor braking system has been depleted to a predetermined low level. Although these systems function satisfactorily, in a situation in which the trailer control line interconnecting the tractor portion of the vehicle with the trailer portion is left disconnected or ruptures, no trailer braking occurs until the tractor system pressure drops to a low level, resulting in long vehicle stopping distances and poor vehicle stability due to tractor braking without trailer braking. Furthermore, once the prior art trailer emergency brakes are applied, they cannot be easily released.

SUMMARY OF THE INVENTION

Consequently, an important object of our invention is to provide a service and emergency braking system for an articulated vehicle having air actuated service and air pressure released emergency brakes which is capable of sensing a rupture in the service line interconnecting the portions of the vehicle and which thereupon conserves the tractor fluid supply and actuates the spring-applied emergency brakes on the trailer.

Another important object of our invention is to provide valving to accomplish the objects set forth hereinabove, and to also provide additional valving which renders this system inoperable until the fluid pressure level has achieved some minimum predetermined pressure level and which thereafter communicates fluid pressure to the above-described system through a flow-restricting orifice.

DESCRIPTON OF THE DRAWINGS

The sole FIGURE of the drawing is a schematic illustration of a vehicle braking system in which the various valve members used therein are illustrated in cross section.

DETAILED DESCRIPTION OF THE PREFERRED EMBODIMENT

Referring now to the drawing, a braking system generally indicated by the numeral 10 includes an automotive air compressor 12 which charges reservoir tanks 14, 15 and 16 in the normal manner, it being noted that the tanks 15 and 16 are charged through the tank 14 and one-way check valves 18 and 19 in a manner well known to those skilled in the art. Of course, the air compressor 12 is operated by the vehicle engine, and the air compressor 12 and the reservoir tanks 14, 15, and 16 are mounted on the tractor portion of the vehicle. A conventional check valve 19 permits communication from reservoir 14 into reservoir 15, but prevents communication in the reverse direction. The reservoir tanks 15 and 16 are connected to corresponding inlets of a conventional operator-actuated dual circuit braking control valve generally indicated by the numeral 20. The brake valve 20 may be of any design well known to those skilled in the art, such as the design disclosed in U.S. Pat. No. 3,266,850, owned by the assignee of the present invention and incorporated herein by reference. The brake valve 20 is, of course, mounted in the vehicle operator's compartment. One of the outlets of the brake valve 20 is connected to the tractor rear service brake actuators 22, and the other outlet of the brake valve 20 is connected to the the tractor front service brake actuators 24. Of course, when a brake application is effected, the valve 20 is actuated to deliver air from the reservoirs 15 and 16 to the rear and front brakes 22 and 24 of the vehicle, respectively.

The outlets of the brake valve 20 are also connected through a conventional double check valve 26 to the inlet 28 of a tractor protection valve generally indicated by the numeral 30. The check valve 26 communicates the higher of the two pressures in the dual braking circuits to the inlet 28 in a manner well known to those skilled in the art. The valve 30 is further provided with an outlet port 32 which is connected through a conventional glad hand connector 34 to the trailer control line 36 which communicates the service braking systems of the tractor with the service braking system of the trailer (not shown). The valve 30 is further provided with a second inlet 38 which is connected with the tractor supply system in a manner which will be described hereinafter, and an outlet 40 which is connected to a trailer supply line or conduit 42 by the glad hand connector 44. The supply line or conduit 42 is connected to appropriate reservoirs and valving carried by the trailer so that fluid pressure communicated through line 42 releases the aforementioned parking and emergency brakes carried by the trailer. Valve 30 further includes a valve seat 46 which is located between the inlet 28 and the outlet 32. A valve member 48 is mounted on a pressure responsive piston 50, and is urged into sealing engagement with the valve seat 46 by a spring 52. Face 54 of the piston 50 is exposed to the fluid pressure level at the inlet 38 and outlet 40, and the opposite face 56 of the piston 50 is exposed to atmospheric air pressure through the port 58. Consequently, when the fluid pressure level acting on face 54 of piston 50 is sufficient to overcome the force of the spring 52, the valve member 48 will be urged away from the valve seat 46 to thereupon permit substantially unrestricted fluid communication between the inlet port 28 and the outlet port 32.

The outlet of the brake control valve 20 which is connected to the rear brake actuator 22 is also connected to an inlet port 60 of a regulating valve generally indicated by the numeral 62. The valve 62 is provided with an outlet port 64, and is further provided with a valve seat 66 located between the inlet port 60 and the outlet port 64 which cooperates with a valve member 68 to control fluid communication between the inlet and outlet. A spring 70 is disposed between an inlet valve member 72 and a valve piston 74 to urge the inlet valve member 72 into sealing engagement with the valve member 68 and to urge the latter into sealing engagement with the valve seat 66. The piston 74 is slidably mounted in the valve member 62, and is urged into the position illustrated in the drawings by a spring 76. A plunger 78 is also carried by the piston 74, and assists the spring 70 in holding the inlet valve member 72 against the valve member 68. A flow-restricting orifice 80 is defined within a valve member 68, to permit limited fluid communication from the inlet 60 to the outlet 64 when the valve member 72 is moved away from this valve member 68 when the latter is still engaged with the valve seat 66. A lost motion connection is provided between the plunger 78 and the piston 74, so that, when the fluid pressure outlet at the outlet 64 is grater than fluid pressure level at the inlet 60, such as would occur upon release of the brakes, the valve member 68 can be urged off seat 66 to permit substantially uninhibited fluid communication between the outlet 64 and the inlet 60.

The outlet 64 is communicated to inlets 82 and 84 of another valve generally indicated by the numeral 86. A pressure differential responsive piston 88 is slidably mounted within the valve 86, and a spring 90 is provided to urge the piston into engagement with a stop 92 provided within the valve 86. The upper face 93 of piston 88 is exposed to the fluid pressure level at the inlet 82 and the opposite face 94 of the piston 88 is communicated with an inlet 96 which is connected to the outlet 32 of the tractor protection valve 30. A valve seat 98 is located within the valve 86 between the inlet 84 and an outlet 100. A valve member 102 is yieldably urged into engagement with the valve seat 98 by a spring 104 to thereby terminate communication between the inlet 84 and the outlet 100.

The outlet 100 of the valve 86 is connected to an inlet 106 of still another valve 108. Valve 108 is provided with another inlet 110 which is connected to the outlet of a push-pull parking and emergency control valve generally indicated by the numeral 112. The valve 112 may be of any type well known to those skilled in the art, and may be, for example, of the type shown in U.S. Pat. No. RE. 25,969, owned by the assignee of the present invention and incorporated herein by reference. The inlet of the valve 112 is connected to the reservoir 14. The valve 112 normally permits communication between the inlet and outlet thereof to charge the supply line of the trailer. When the vehicle is to be parked, the push-pull valve is actuated to vent the supply line of the trailer to therefore apply the trailer parking and emergency brakes. Similarly, when the fluid pressure level in the reservoir 14 drops below a very low pressure level, the valve 112 is designed to automatically pop open to vent the supply line 42 of the trailer. The valve 108 further includes an outlet port 114 which is connected to the inlet 38 of the tractor protection valve 30. A valve seat 116 is located between the inlet port 110 and the outlet port 114, and a spring 118 yieldably urges the valve member 120 into sealing engagement with the valve seat 116. However, a pressure responsive piston 122 is slidably mounted within the valve 108, and the lowermost end 126 thereof is adapted to sealingly engage the valve member 120. A spring 128, which is substantially stronger than the spring 118, urges the piston 122 downwardly viewing the FIGURE, thereby urging the valve member 120 out of engagement with the valve seat 116 and thereby normally permitting substantially uninhibited fluid communication between the inlet 110 and the outlet 114. The valve piston 122 is provided with an internal passage 128 to permit communication between the outlet port 114 and atmosphere through the passage 128 and exhaust port 130 when the end 126 of the piston 122 is moved out of engagement with the valve member 120 after the latter has sealingly engaged the valve seat 116. The piston 122 defines a fluid pressure face 132 thereon, which is exposed to the fluid pressure level communicated to the port 106. Consequently, when the fluid pressure at the port 106 exceeds some predetermined value, the piston 122 will be urged upwardly in opposition to the spring 128, thereby permitting the valve member 120 to close against the seat 116 to terminate the fluid communication between the ports 110 and 114 and thereby venting the port 114 to atmosphere through the passage 128 and the exhaust port 130. A flow restricting orifice 134 is provided in the inlet port 110 to eliminate pressure surges in the system from inadvertently actuating the valve 112.

MODE OF OPERATION OF THE PREFERRED EMBODIMENT

The various components in the system are illustrated in the positions which they assume when the vehicle is parked and all braking pressure in the tractor reservoirs has been depleted. When the vehicle engine is started, the air compressor 12 charges the reservoir tanks 14, 15, and 16, thereby permitting the operator to charge the supply line or conduit to the trailer by depressing the button on top of the valve 112. Of course, the operator must keep the button depressed until some predetermined low pressure level is attained in the conduit 42. When the fluid pressure force developed against face 54 of piston 50 is large enough to overcome spring 52, valve member 48 is moved away from seat 46.

When a service brake application is effected, the operator-operated control valve 20 is actuated, thereby communicating pressure from the reservoir tanks 15 and 16 to the brake actuators 22, 24. At the same time, pressure is also communicated from inlet port 28 to outlet port 32 of tractor protection valve 30 to also effect a service brake application on the trailer. Also, the fluid pressure generated at the outlet of the control valve 20 is communicated to the inlet of the regulating valve 62. When the pressure level attained therein equals some predetermined level sufficient to overcome the force of spring 70 and 76, the valve piston 74 moves upwardly to permit limited communication through the orifice 80 of the valve member 68, thereby communicating fluid pressure to the inlets 82 and 84 of the valve member 86. Of course, since fluid pressure has also been communicated to the outlet port 32 of the tractor protection valve 30 during the service actuation, a high pressure level also acts against face 94 of the piston 88. However, because of the flow restricting orifice 80, the piston 88 cannot be actuated by pressure surges in the system before pressure has been communicated to the outlet port 32 of the tractor protection valve 30. Also, because fluid pressure must first build up to an extent necessary to overcome the spring 76, pressure communication to the face 92 of piston 88 is further delayed by some predetermined time to further insure against inadvertent actuation of the valves. When the piston 88 is disposed in the normal position illustrated in the drawing, the valve member 102 is closed against valve seat 98, and fluid communication is prevented through the valve member 86 to the inlet 106 of the valve 108. Therefore, the piston 122 will be disposed in the position illustrated in the drawings during a normal service brake application and at all other times during normal operation of the vehicle, to permit pressure communication through the valve 108 to the inlet 38 of the tractor protection valve 30. The relatively high pressure level between the ports 38 and 40 of the tractor protection valve 30 maintains the valve piston 50 in the position holding the valve member 48 away from the valve seat 46 to permit substantially uninhibited fluid communication between the ports 28 and 32 of the valve 30.

However, if the connection 34 between the conduit 36 and the braking system 10 should be disconnected, due to a rupture of the service line 36, or neglect by the vehicle operator to couple the coupling 34, the outlet of tractor protection valve 30 will be vented to atmosphere, thereby dropping the pressure level at the outlet port 32 to a relatively low level. Since the port 96 of the valve 86 is communicated to the port 32 of valve 30, the pressure level communicated to the port 96 and therefore the pressure level acting on face 94 of piston 88 will be reduced to a relatively low level, thereby permitting the higher pressure level acting on the face 92 of the piston 88 to urge the latter downwardly, forcing the valve member 102 from the valve seat 98. Since a finite amount of time is required for fluid to communicate from brake valve 20 to the outlet port 32 of the tractor protection valve 30, the regulator valve 62 has been provided to terminate fluid communication to the port 82 until a predetermined fluid level has been attained. Also the orifice 80 in the valve member 68 restricts communication to the inlet port 82, so that the pressure acting on face 92 is less than or equal to the pressure acting light on face 94 except when the aforementioned malfunction in the service line 36 or glad hand connector 34 has occurred. When such a malfunction has occurred, the higher fluid pressure acting on face 92 urges piston 88 downwardly to open the valve member 102 as mentioned hereinabove. Consequently, high fluid pressure will be communicated to the inlet port 106 of the valve 108. This high pressure fluid at the inlet port 106 acts upon face 132 of piston 122, driving the latter upwardly viewing the FIGURE. Upward movement of the piston 122 permits the valve member 120 to close against the seat 116, thereby terminating fluid communication between the push-pull valve 112 and the tractor protection valve 30. Further upward movement of the piston 122 communicates the port 114 with atmosphere through the passage 128 and exhaust port 130, to vent the fluid pressure level in the trailer supply conduit 42. Venting of the supply conduit 42 actuates the trailer emergency brakes in a manner well known to those skilled in the art. Since the pressure in the emergency system has been vented through the valve 108, the pressure level at ports 38, 40 of tractor protection valve 30 is reduced to a relatively low level, thereby permitting the spring 52 to urge the valve member 48 into sealing engagement with the valve seat 46 to prevent communication to the service conduit 36. The closing of valve members 48 and 120 conserves the fluid pressure content of the tanks 14, 15, and 16 for use by the tractor.

We claim:
1. In a fluid pressure braking system for a vehicle having service brakes, a service braking system including a first portion for actuating some of said service brakes and a second portion communicated to said first portion for actuating the rest of said service brakes, operator-actuated valve means for controlling fluid pressure communication in said service braking system, regulating valve means having an inlet connected to said brake valve and an outlet, valve members located between said inlet and outlet for preventing communication therebetween until a predetermined pressure level is attained at said inlet and thereafter communicating said inlet and outlet, and valve means having a first inlet connected to the outlet of said regulating valve means, a second inlet connected to the connection between said first and second portions of the service brake actuating systems, pressure differential responsive valve members shiftable to an actuating position when the pressure level at said first and second inlets are in a predetermined relationship with one another, and means responsive to shifting of said pressure differential responsive means to said actuated position for closing communication between the first and second portions of said service actuating system.

2. The invention of claim 1:
said regulating valve means including means limiting fluid communication between the inlet and outlet of the regulating valve means after said predetermined pressure level is attained.

3. The invention of claim 1:
said regulating valve means including means defining a flow restricting orifice permitting limited fluid communication between inlet and outlet, said valve members including means responsive to the pressure level at the inlet for closing said orifice until said predetermined pressure level is attained and thereafter permitting communication through said orifice.

4. The invention of claim 3:
said valve members including a valve element, said orifice being defined in said valve element, said means responsive to the fluid pressure level at the inlet including a pressure responsive piston and first resilient means yieldably urging said piston toward a position closing said orifice, the fluid pressure level acting on said piston in opposition to said first resilient means to urge said piston away from the orifice when said predetermined pressure level is attained.

5. The invention of claim 4:
said valve members further including a valve seat, second resilient means yieldably urging said valve element into sealing engagement with said valve seat, said valve element being urged away from said valve seat when the fluid pressure level at said outlet exceeds the fluid pressure level at the inlet whereby substantially uninhibited fluid communication is permitted from the outlet to the inlet when the pressure level at the outlet exceeds the pressure level at the inlet and communication from the inlet to the outlet is restricted by said orifice.

\* \* \* \* \*